US012807794B2

(12) United States Patent
Tadiello et al.

(10) Patent No.: US 12,807,794 B2
(45) Date of Patent: Nov. 24, 2026

(54) TYRE FOR VEHICLE WHEELS

(71) Applicant: Pirelli Tyre S.p.A., Milan (IT)

(72) Inventors: Luciano Tadiello, Milan (IT); Luca Giannini, Milan (IT); Chaiaroon Wuthicharn, Nonthaburi (TH); Chonnart Wuthicharn, Nonthaburi (TH)

(73) Assignee: PIRELLI TYRE S.p.A., Milan (IT)

( * ) Notice: Subject to any disclaimer, the term of this patent is extended or adjusted under 35 U.S.C. 154(b) by 672 days.

(21) Appl. No.: 18/255,464

(22) PCT Filed: Dec. 28, 2021

(86) PCT No.: PCT/IB2021/062367
§ 371 (c)(1),
(2) Date: Jun. 1, 2023

(87) PCT Pub. No.: WO2022/144759
PCT Pub. Date: Jul. 7, 2022

(65) Prior Publication Data

US 2024/0043665 A1 Feb. 8, 2024

(30) Foreign Application Priority Data

Dec. 29, 2020 (IT) ........................ 102020000032627

(51) Int. Cl.
*C08L 9/10* (2006.01)
*B60C 1/00* (2006.01)
*C08L 97/00* (2006.01)

(52) U.S. Cl.
CPC *C08L 9/10* (2013.01); *B60C 1/00* (2013.01); *C08L 97/005* (2013.01); *C08L 2201/54* (2013.01)

(58) Field of Classification Search
CPC .................................. C08L 9/10; C08L 97/00
USPC ........................................................... 524/76
See application file for complete search history.

(56) References Cited

U.S. PATENT DOCUMENTS 2,575,061 A 11/1951 McMahon
2,608,537 A * 8/1952 Pollak ...................... C08L 7/02 524/925
2,610,954 A 9/1952 Raff et al.
2,676,931 A 4/1954 Pollak
2,802,815 A 8/1957 Doughty
2,906,718 A 9/1959 Mills et al.
3,079,360 A 2/1963 Sutherland, Jr. et al.
3,163,614 A 12/1964 Dimitri
3,282,871 A 11/1966 Dimitri
3,296,158 A 1/1967 Dimitri
3,312,643 A 4/1967 Ball
3,364,158 A 1/1968 Griffith et al.
3,817,974 A 6/1974 Sirianni et al.
3,984,362 A 10/1976 Sirianni et al.
3,991,022 A 11/1976 Dimitri
4,477,612 A 10/1984 Boutsicaris
2010/0204368 A1 8/2010 Benko et al.
2011/0073229 A1 3/2011 Veas et al.
2021/0071049 A1 3/2021 Gouveia et al.

FOREIGN PATENT DOCUMENTS

CN 1184830 A 6/1998
CN 102718995 A 10/2012
CN 103709772 A 4/2014
CN 103756060 A 4/2014
CN 106317456 A 1/2017
EP 2 042 346 A1 4/2009
GB 633725 A 12/1949
GB 723751 2/1955
GB 836393 6/1960
GB 979999 A 1/1965
JP 2008-308615 A 12/2008
JP 2010-242023 A 10/2010
JP 2010-248282 A 11/2010
JP 2014-129509 A 7/2014
JP 2020084020 A 6/2020
WO WO 2009/145784 A1 12/2009
WO WO 2016/174628 A1 11/2016
WO WO 2017/109672 6/2017
(Continued)

OTHER PUBLICATIONS

International Search Report form the European Patent Office in corresponding International Application No. PCT/IB2021/062367 mailed Apr. 19, 2022.
(Continued)

*Primary Examiner* — Deve V Hall
(74) *Attorney, Agent, or Firm* — Finnegan, Henderson, Farabow, Garrett & Dunner, L.L.P.

(57) ABSTRACT

A tyre (100) for vehicle wheels is described comprising at least one structural element comprising a vulcanized elastomeric material obtained by vulcanizing a vulcanizable elastomeric composition comprising a predispersion of an elastomeric diene polymer and lignin obtained by a process comprising: a) providing in a dispersant liquid a first lignin suspension having a value of a median particle diameter D50 equal to or less than 10 microns; b) providing a second suspension comprising lignin and elastomeric diene polymer latex by mixing the first lignin suspension obtained from step a) with the latex; and c) removing the dispersant liquid from the second suspension comprising lignin and elastomeric diene polymer latex.

32 Claims, 2 Drawing Sheets

(56) References Cited

FOREIGN PATENT DOCUMENTS

WO WO-2017109672 A1 * 6/2017 ................ C08L 9/00
WO WO 2019/213730 A1 11/2019

OTHER PUBLICATIONS

Written Opinion of the International Searching Authority from the European Patent Office in corresponding International Application No. PCT/IB2021/062367 mailed Apr. 19, 2022.
Notification of the First Office Action issued by the China National Intellectual Property Administration on Jul. 9, 2026, in corresponding Chinese Application No. 202180078584.2 filed Dec. 28, 2021 (9 pages).

* cited by examiner

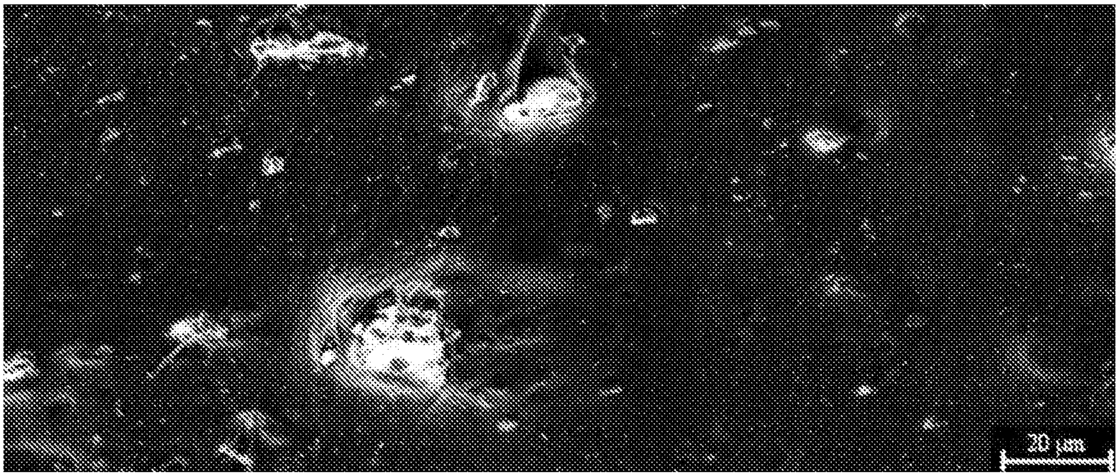
FIG. 2A (COMPARATIVE)
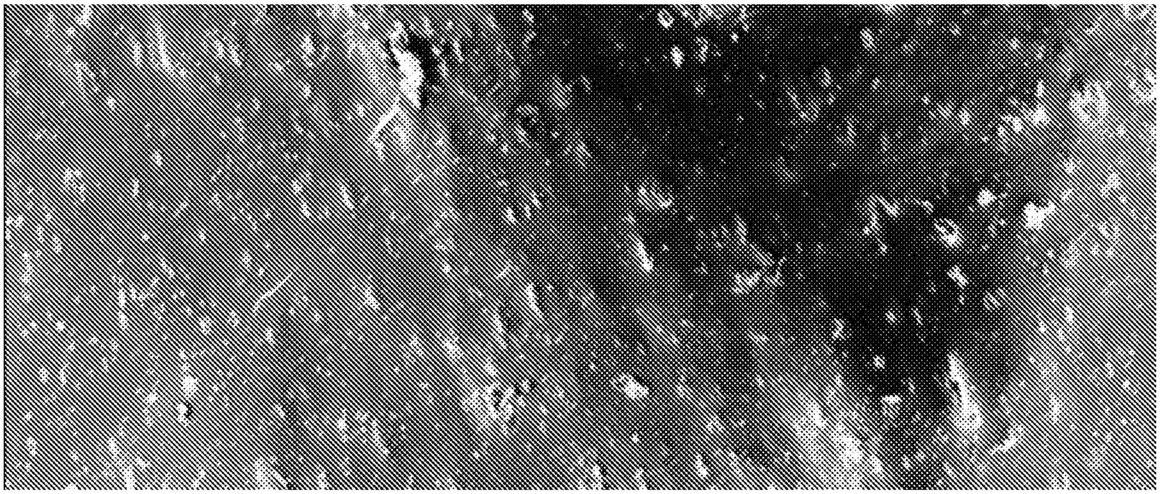
FIG. 2B (INVENTION)

TYRE FOR VEHICLE WHEELS

This application is a national stage entry application under 35 U.S.C. § 371 of International Application No. PCT/IB2021/062367, filed on Dec. 28, 2021, and claims priority to Italian Application No. 102020000032627, filed Dec. 29, 2020; the contents of each application is incorporated herein by reference in its entirety.

FIELD OF THE INVENTION

The present invention relates to a tire for vehicle wheels.

More particularly, the present invention relates to a tire comprising at least one structural element comprising a vulcanized elastomeric material obtained by vulcanizing a vulcanizable elastomeric composition comprising a predispersion of an elastomeric diene polymer and lignin.

The present invention also relates to a process for preparing a predispersion of elastomeric diene polymer and lignin, to a predispersion of elastomeric diene polymer and lignin obtained by means of such a process, to a process for producing a vulcanizable elastomeric composition and to a process for producing a tyre for vehicle wheels.

Related Art

Tyres for vehicle wheels comprising lignin are described in patent applications US2010/0204368, WO2009/145784, JP2008/308615, JP2010/242023, JP2010/248282, JP2014/129509, CN102718995, CN103756060, WO 2017/109672 and in patents GB723751, GB836393, U.S. Pat. Nos. 2,610,954, 2,802,815, 2,906,718, 3,079,360, 3,163,614, 3,282,871, 3,296,158, 3,312,643, 3,364,158, 3,817,974, 3,984,362 and 3,991,022.

In particular, patent application WO 2017/109672, in the name of the same Applicant, describes a tyre for vehicle wheels comprising at least one structural element comprising a vulcanized elastomeric material obtained by vulcanizing a vulcanizable elastomeric composition comprising a predispersion of natural rubber and lignin obtained by co-precipitation from latex.

According to this document, the lignin has a concentration of phenolic groups greater than 2 mmoles per gram of lignin, whereas the aforementioned predispersion comprises an amount of lignin such as to provide a lignin concentration of about 25 phr or less in the vulcanizable elastomeric composition.

SUMMARY OF THE INVENTION

In the rubber industry, particularly in the production of tyres, it is typical to use elastomeric compositions in which reinforcing fillers have been incorporated in the elastomeric polymer base to improve the characteristics of the resulting vulcanized products, in particular mechanical properties.

Thanks to its high reinforcing efficiency, carbon black is a particularly commonly-used reinforcing filler. However, carbon black represents a non-renewable raw material, deriving mainly from partial combustion processes of fossil fuels, mainly naphtha, methane gas, and other hydrocarbons.

Moreover, carbon black may be of environmental concern as it is a potential pollutant if not properly disposed of. The replacement or reduction of the use of carbon black therefore represents a goal not only of interest to tyre manufacturers, but of common interest to the community.

The Applicant has perceived a need to provide tyres and components thereof that are more environmentally sustainable and eco-friendly, for example, by reducing or replacing petroleum-derived raw materials with raw materials produced from renewable sources and, all the while, maintaining and possibly improving the performance of the tyre.

Examples of the most abundant biopolymers from renewable sources for application in tyres include starch, cellulose, lignin, and hemicellulose. In the past, several attempts have been made to potentially use some of these materials as reinforcing agents, which also have a specific weight lower than conventional reinforcing fillers. Lignin, for example, has been used, as such or modified in various ways, as a reinforcing filler in tyre compounds, with modest results.

Lignin is a complex organic polymer having a three-dimensional polymeric structure consisting of phenylpropane units, and belonging to the class of so-called phenylpropanoid compounds.

Lignins have very different compositions and molecular weights depending both on the biomass chosen and the process by which they are obtained. The composition varies both in terms of functional groups, mainly of the phenolic and hydroxyl and carboxyl type, and in terms of molecular weight.

The Applicant has observed that the predispersion of natural rubber and lignin obtained by co-precipitation from latex disclosed by WO 2017/109672 may have certain technological limitations in the flexibility of formulation of the vulcanizable elastomeric compositions used to make tyre structural elements.

In particular and as reported in WO 2017/109672, the Applicant has observed that increasing the amount of lignin present in the predispersion beyond certain limits may result in a degradation of the mechanical properties of the vulcanized elastomeric composition obtained, a degradation that is believed to be associated with a suboptimal vulcanization evidenced by low torque (MH) values obtained during the vulcanization step.

In addition to this, the Applicant has observed that by operating according to the co-precipitation process from latex disclosed by WO 2017/109672, as the amount of lignin present in the predispersion increases, the volumes of by-products to be disposed of resulting from the coagulation process, essentially consisting of coagulation wastewater and the salts contained therein, also inevitably and significantly increase.

These high volumes of by-products constitute both an environmental problem given the need of their disposal, and a cost problem given that such disposal inevitably affects the overall costs of the natural rubber and lignin preparation process and ultimately of the tyre manufacturing process.

Conversely, it would instead be desirable to have the availability of a predispersion of an elastomeric diene polymer and lignin having high amounts of lignin so as to thereby have greater flexibility of formulation of vulcanizable elastomeric compositions.

When the elastomeric diene polymer is natural rubber, as disclosed by WO 2017/109672, such a predispersion having large amounts of lignin would indeed allow suitable amounts of lignin to be dosed, freeing itself as much as possible from the simultaneous contribution of natural rubber, which is present in many formulations of vulcanizable elastomeric compositions in relatively small amounts.

The Applicant has found that it is possible to obtain a predispersion of an elastomeric diene polymer and lignin having the desired large amount of lignin and that at the same time is capable of maintaining and even improving the mechanical properties of the vulcanized elastomeric composition formulated using the predispersion.

In particular, the Applicant has found that by means of a new preparation technique which provides for essentially physical operating steps including mixing a lignin suspension having a suitable particle size with a latex of an elastomeric diene polymer and subsequently removing the liquid phase present, it is possible to significantly increase the amount of lignin in a predispersion.

The Applicant has surprisingly found that a predispersion of elastomeric diene polymer having high lignin content thus obtained allows to improve the flexibility of formulation of the vulcanizable elastomeric compositions used to prepare tyre structural elements improving the mechanical properties of the vulcanized elastomeric compositions.

This, along with an advantageous elimination of the by-products deriving from the latex co-precipitation process with an equally advantageous reduction of both the environmental impact and of the costs of the process for preparing the predispersion and of manufacturing the tyre that comprises the same.

Therefore, the present invention relates, in a first aspect thereof, to a tyre for vehicle wheels comprising at least one structural element comprising a vulcanized elastomeric material obtained by vulcanizing a vulcanizable elastomeric composition comprising a predispersion of an elastomeric diene polymer and lignin obtained by a process comprising:

a) providing in a dispersant liquid a first lignin suspension having a value of a median particle diameter D50 equal to or less than 10 microns;

b) providing a second suspension comprising lignin and elastomeric diene polymer latex by mixing the first lignin suspension obtained from step a) with said latex; and d) removing the dispersant liquid from said second suspension comprising lignin and elastomeric diene polymer latex until said predispersion of elastomeric diene polymer and lignin is obtained.

The Applicant has found that thanks to the use of a predispersion of natural rubber and lignin obtained by means of mechanical and essentially physical operations of mixing a lignin suspension having a median particle diameter D50 equal to or less than 10 microns with an elastomeric diene polymer latex and of subsequently removing the dispersing liquid phase, it is possible to obtain a tyre which, with respect to the prior art, is provided with a series of very advantageous technical effects, including:

- improved flexibility of formulation of the vulcanizable elastomeric compositions used to make tyre structural elements;
- maintaining or improving the dynamic mechanical properties of the vulcanized elastomeric compositions with respect to standard reference lignin-free compositions;
- elimination of the by-products deriving from the latex co-precipitation technique, to the benefit of a lower environmental impact and lower production costs of the predispersion and of the tyre;
- full compatibility of the production processes of the predispersion and of the vulcanizable elastomeric composition that incorporates the same with the processes used in the field of tyre manufacturing.

The Applicant has also experimentally observed that the improved effects observed on the dynamic mechanical properties of vulcanized elastomeric compositions that may be used for manufacturing a tyre are related not only to the lignin particle size but also to the manner in which such particles are incorporated in the vulcanizable elastomeric compositions.

The Applicant, in fact, has experimentally observed, as will be illustrated in more detail hereinafter, that by incorporating lignin particles having the aforementioned particle size in the polymeric matrix of the vulcanizable elastomeric composition by means of the predispersion according to the present invention, it is possible to obtain improved effects on the dynamic mechanical properties of standard lignin-free vulcanized elastomeric compositions, whereas by incorporating the same lignin particles in powder form, for example obtained by drying after wet grinding of coarser particles, the dynamic mechanical properties worsen with respect to those of the standard vulcanized elastomeric compositions taken as reference.

Without wishing to be bound to any interpretative theory, the Applicant deems that as a result of the process for preparing the predispersion of elastomeric diene polymer and lignin according to the invention, some kind of interaction may be established between the lignin particles in suspension and the emulsion of the elastomeric diene polymer droplets, which it was not possible to elucidate at this time, but which allows the lignin particles to carry out an effective reinforcing action in the elastomeric composition in which they are incorporated.

In a second aspect thereof, the present invention relates to a process for preparing a predispersion of an elastomeric diene polymer and lignin comprising steps a)-c) above.

In a third aspect thereof, the present invention relates to a predispersion of an elastomeric diene polymer and lignin obtained by means of the preparation process as described in the present document.

Advantageously, the predispersion of elastomeric diene polymer and lignin according to the invention facilitates storage, transportation and dosage during use and further facilitates the dispersion of the lignin within the elastomeric composition therefore contributing to improving the reinforcing effect thereof.

In a fourth aspect thereof, the present invention relates to a process for producing a vulcanizable elastomeric composition comprising:

- feeding to at least one mixing apparatus at least the following components of a vulcanizable elastomeric composition: at least one predispersion of elastomeric diene polymer and lignin obtained by a process as described in the present document, optionally at least one elastomeric diene polymer, optionally at least one reinforcing filler, and at least one vulcanizing agent,
- mixing and dispersing said components so as to obtain said vulcanizable elastomeric composition, and
- discharging said vulcanizable elastomeric composition from said mixing apparatus.

In a fifth aspect thereof, the present invention relates to a process for producing a tyre for vehicle wheels, wherein the process comprises:

- providing a vulcanizable elastomeric composition comprising a predispersion of an elastomeric diene polymer and lignin obtained by a process as described in the present document;
- providing a structural element of a tyre comprising the vulcanizable elastomeric composition;
- assembling the structural element of a tyre in a green tyre;
- vulcanizing the green tyre.

Advantageously, thanks to the dispersibility and workability properties of the predispersion according to the invention, the production process of the tyre which incorporates the same is easy to implement on conventional production lines thereby contributing to keeping down the production costs.

Definitions

Within the framework of the present description and of the subsequent claims, the term "predispersion of an elastomeric diene polymer and lignin" (or "masterbatch"), is used to indicate a polymeric compound in which an additive, in the present case lignin, is dispersed and diluted in a polymer matrix in order to be more easily dosed in subsequent processing steps.

Within the framework of the present description and of the subsequent claims, the expression "elastomeric polymer" or "elastomer" is used to indicate a natural or synthetic polymer which, after vulcanization, can be repeatedly stretched at room temperature to at least twice its original length and which after removal of the tensile load immediately and forcefully returns approximately to its original length (definition according to ASTM, Committee E8, Philadelphia 1976).

Within the framework of the present description and of the subsequent claims, the expression "diene polymer" is used to indicate a polymer or copolymer deriving from the polymerization of one or more different monomers, at least one of which is a conjugated diene (conjugated diolefin).

Within the framework of the present description and of the subsequent claims, the term "green" is used to indicate a material, a composition, a component or a tyre that has not been vulcanized yet.

Within the framework of the present description and of the subsequent claims, all the numerical entities indicating quantities, parameters, percentages, and so forth are to be considered preceded in every circumstance by the term "about" unless otherwise indicated. Moreover, all the ranges of numerical entities include all the possible combinations of maximum and minimum numerical values and all the possible intermediate ranges, in addition to those specifically indicated hereinbelow.

Within the framework of the present description and of the subsequent claims, the term "phr" (an acronym for parts per hundred parts of rubber) indicates the parts by weight of a given component of elastomeric compound per 100 parts by weight of the elastomeric polymer considered net of any plasticizing extraction oils.

Unless otherwise indicated, all percentages are expressed as percentages by weight.

The present invention can, in one or more of the aforementioned aspects, have one or more of the preferred features given hereinbelow, which can be combined with one another as desired according to the application requirements.

The Vulcanizable Elastomeric Composition

The vulcanizable elastomeric composition according to the present invention comprises 100 phr of at least one elastomeric diene polymer.

In preferred embodiments, the polymeric component of the vulcanizable elastomeric composition may consist of only the elastomeric diene polymer of the predispersion of elastomeric diene polymer and lignin of the invention.

In further preferred embodiments, the polymeric component of the vulcanizable elastomeric composition may comprise a further elastomeric diene polymer selected from those commonly used in vulcanizable elastomeric materials with sulfur and/or peroxide, which are particularly suitable for producing tyres, i.e. from elastomeric polymers or copolymers with an unsaturated chain having a glass transition temperature (Tg) generally below 20° C., preferably comprised in the range of 0° C. to −110° C. These polymers or copolymers may be of natural origin or may be obtained by solution polymerization, emulsion polymerization or gas phase polymerization of one or more conjugated diolefins, possibly mixed with at least one comonomer selected from monovinylarenes and/or polar comonomers in an amount not greater than 60% by weight.

Conjugated diolefins generally contain 4 to 12, preferably 4 to 8 carbon atoms and can be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene, or mixtures thereof.

1,3-butadiene and isoprene are particularly preferred.

Monovinylarenes, which may optionally be used as comonomers, generally contain from 8 to 20, preferably 8 to 12 carbon atoms and can be selected, for example, from: styrene; 1-vinylnaphthalene; 2-vinylnaphthalene; various alkyl, cycloalkyl, aryl, alkylaryl or arylalkyl derivatives of styrene such as, for example, α-methylstyrene, 3-methylstyrene, 4-propylstyrene, 4-cyclohexylstyrene, 4-dodecylstyrene, 2-ethyl-4-benzylstyrene, 4-p-tolylstyrene, 4-(4-phenylbutyl)styrene, or mixtures thereof. Styrene is particularly preferred.

Polar comonomers, which may possibly be used, can be selected, for example, from: vinylpyridine, vinylquinoline, esters of acrylic acid and alkylacrylic acid, nitriles, or mixtures thereof, such as, for example, methyl acrylate, ethyl acrylate, methyl methacrylate, ethyl methacrylate, acrylonitrile, or mixtures thereof.

Preferably, the elastomeric diene polymer which can be used in the present invention can be selected, for example, from: cis-1,4-polyisoprene (natural or synthetic, preferably natural rubber), 3,4-polyisoprene, polybutadiene (particularly polybutadiene having a high 1,4-cis content), possibly halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof.

In preferred embodiments, said vulcanizable elastomeric composition can comprise from 3 phr to 100 phr of natural rubber.

The aforementioned vulcanizable elastomeric composition can optionally comprise at least one elastomeric polymer of one or more monoolefins with an olefinic comonomer or derivatives thereof. The monoolefins can be selected from: ethylene and α-olefins generally containing 3 to 12 carbon atoms, such as, for example, propylene, 1-butene, 1-pentene, 1-hexene, 1-octene, or mixtures thereof. The following are preferred: copolymers of ethylene and an α-olefin, possibly with a diene; homopolymers of isobutene or copolymers thereof with small amounts of a diene, which are possibly at least partially halogenated.

The diene possibly present generally contains from 4 to 20 carbon atoms and is preferably selected from: 1,3-butadiene, isoprene, 1,4-hexadiene, 1,4-cyclohexadiene, 5-ethylidene-2-norbornene, 5-methylene-2-norbornene, vinylnorbornene, or mixtures thereof. Among them, the following are particularly preferred: ethylene/propylene (EPR) copolymers or ethylene/propylene/diene (EPDM) copolymers; polyisobutene; butyl rubbers; halobutyl rubbers, in particular chlorobutyl or bromobutyl rubbers; or mixtures thereof.

An elastomeric diene polymer or an elastomeric polymer functionalized by reaction with suitable terminating agents or coupling agents may also be used. In particular, elastomeric diene polymers obtained by anionic polymerization in the presence of an organometallic initiator (in particular, an organolithium initiator) can be functionalized by reacting the residual organometallic groups derived from the initiator with suitable terminating agents or coupling agents such as, for example, imines, carbodiimides, alkyl tin halides, substituted benzophenones, alkoxysilanes or aryloxy-silanes.

In a preferred embodiment, the reinforcing filler of the vulcanizable elastomeric composition may consist of only the lignin present in the predispersion of elastomeric diene polymer and lignin of the invention.

In a preferred embodiment and in order to satisfy specific application requirements, the vulcanizable elastomeric composition of the tyre according to the present invention may also comprise a standard reinforcing filler.

Preferably, the standard reinforcing filler is selected from carbon black, precipitated amorphous silica, amorphous silica of natural origin, silicate fibers, or mixtures thereof.

Preferably, the standard reinforcing filler is present in the vulcanizable elastomeric composition in an amount generally comprised between 1 phr and 120 phr, preferably between 20 phr and 90 phr.

Preferably, the standard reinforcing filler is carbon black having a surface area not lower than 20 $m^2/g$ (determined by STSA—statistical thickness surface area according to ISO 18852:2005)

Preferably, said carbon black reinforcing filler is present in the vulcanizable elastomeric composition in an amount comprised between 1 phr and 120 phr, preferably between 20 phr and 90 phr.

Preferably, the standard reinforcing filler is silica, selected from a pyrogenic silica or, preferably a precipitated silica.

Preferably, the silica has a BET surface area (measured according to ISO Standard 5794/1) comprised between 50 $m^2/g$ and 500 $m^2/g$, more preferably between 70 $m^2/g$ and 200 $m^2/g$.

Within the framework of the present description and of the subsequent claims, the expression "white reinforcing fillers" is used to indicate the reinforcing fillers of the vulcanizable elastomeric composition with the exclusion of carbon black based fillers. Typical examples of white reinforcing fillers are gypsum, talc, kaolin, bentonite, titanium dioxide, and silica, in the form of precipitated amorphous silica, naturally occurring amorphous silica, silicate fibers, or mixtures thereof.

In an embodiment, the modified silicate fibers may be, for example, fibers modified by acid treatment with partial removal of magnesium, such as those described and exemplified in patent application WO 2016/174629 A1.

In an embodiment, the modified silicate fibers may be, for example, fibers modified by deposition of amorphous silica on the surface, such as those described and exemplified in patent application WO 2016/174628 A1.

In an embodiment, the modified silicate fibers may be fibers organically modified by reaction with, for example, quaternary ammonium salts such as sepiolite fibers modified by reaction with thalloyl benzyl dimethyl ammonium chloride commercialized by Tolsa under the name Pangel B5.

In an embodiment, the modified silicate fibers may be fibers modified by reaction with a silanizing agent selected, for example, from mono- or bifunctional silanes having one or two or three hydrolyzable groups such as bis-(3-triethoxysilyl-propyl) disulfide (TESPD), bis(3-triethoxysilyl-propyl) tetrasulfide (TESPT), 3-thiooctanoyl-1-propyl-triethoxysilane (NXT), $Me_2Si(OEt)_2$, $Me_2PhSiCl$, $Ph_2SiCl_2$.

The vulcanizable elastomeric composition of the tyre according to the present invention comprises at least one vulcanizing agent.

The most advantageously used vulcanizing agent is sulfur or, alternatively, sulfur-containing molecules (sulfur donors), with accelerants, activators and/or retardants known to those skilled in the art. Alternatively, the vulcanizing agent may be a peroxide that contains an O—O bond and may generate reactive radicals by heating.

Sulfur or derivatives thereof may be advantageously selected, for example, from: (i) soluble sulfur (crystalline sulfur); (ii) insoluble sulfur (polymeric sulfur); (iii) oil-dispersed sulfur (for example 33% sulfur known by the trade name Crystex OT33 from Eastman); (iv) sulfur donors such as, for example, caprolactam disulfide (CLD), bis[(trialkoxysilyl)propyl]polysulfides, dithiophosphates; or mixtures thereof.

Preferably, the vulcanizing agent is present in the vulcanizable elastomeric composition in an amount from 0.1 to 15 phr, preferably from 1 to 10 phr, even more preferably from 2 to 7 phr.

The vulcanizable elastomeric composition of the tyre according to the present invention may also comprise at least one silane coupling agent capable of interacting with any silica that may be present as a reinforcing filler and/or silicates and binding them to the elastomeric diene polymer during vulcanization.

Preferably, the silane coupling agent used in the present invention is selected from those having at least one hydrolyzable silane substituent group, silane which can be identified, for example, by the following general formula (IV):

$$(R)_3Si—C_nH_{2n}—X \quad (IV)$$

where the R groups, which may be identical or different, are selected from: alkyl, alkoxy or aryloxy groups or from halogen atoms, provided that at least one of the R groups is an alkoxy or aryloxy group or a halogen; n is an integer between 1 and 6 inclusive; X is a group selected from: nitroso, mercapto, amino, epoxide, vinyl, imide, chlorine, $—(S)_mC_nH_{2n}—Si—(R)_3$ and —S—COR, where m and n are integers between 1 and 6 inclusive and the R groups are defined as above.

Among the silane coupling agents, particularly preferred ones are bis-(3-triethoxysilyl-propyl) disulfide (TESPD) and bis(3-triethoxysilyl-propyl) tetrasulfide (TESPT). Said coupling agents may be used as such or in a mixture with an inert filler (for example carbon black) so as to facilitate their incorporation in the vulcanizable elastomeric composition.

Preferably, said silane coupling agent is present in the vulcanizable elastomeric composition in an amount comprised between 0.1 phr and 15 phr, preferably between 0.5 phr and 10 phr.

Preferably, the silane coupling agent and the vulcanizing agent are used in combination with accelerants and/or activators known to those skilled in the art.

Accelerants that are commonly used may be selected from: dithiocarbamates, guanidine, thiourea, thiazoles, sulfenamides, thiourams, amines, xanthates, or mixtures thereof.

Preferably, vulcanization accelerants are present in the vulcanizable elastomeric composition of the invention in amounts of 0.1 to 8 phr, preferably 0.3 to 6 phr.

Activators that are particularly effective are zinc compounds and in particular ZnO, $ZnCO_3$, zinc salts of saturated or unsaturated fatty acids containing 8 to 18 carbon atoms, such as, for example, zinc octanoate or stearate, which may possibly be formed in situ in the vulcanizable elastomeric composition from ZnO and fatty acid, or mixtures thereof.

Preferably, the vulcanization activators are present in the vulcanizable elastomeric composition of the invention in amounts of 0.2 to 15 phr, preferably 0.5 to 10 phr.

Finally, the vulcanizable elastomeric materials according to the invention may comprise other commonly used additives, selected on the basis of the specific application for which the composition is intended. For example, the following may be added to said materials: antioxidants, anti-aging agents, plasticizers, adhesives, anti-ozone agents, modifying resins, or mixtures thereof.

In particular, in order to further improve workability, plasticizers generally selected from mineral oils, vegetable oils, synthetic oils, liquid polymers, or mixtures thereof, such as, for example, aromatic oil, naphthenic oil, phthalates, soybean oil, or mixtures thereof, may be added to said vulcanizable elastomeric composition. The amount of plasticizer is generally comprised between 0 phr and 70 phr, preferably between 5 phr and 30 phr.

Preferably, the vulcanizable elastomeric composition according to the invention comprises at least 10 phr, preferably at least 30 phr, and more preferably at least 40 phr, up to a maximum of 200 phr of said predispersion of elastomeric diene polymer and lignin, wherein the lignin content in the predispersion is equal to 50% by weight or greater.

In this way, it is advantageously possible to have a vulcanizable elastomeric composition having a lignin concentration that can be changed as a function of the most diverse application requirements.

Preferably, the concentration of lignin introduced in the vulcanizable elastomeric composition by the predispersion of elastomeric diene polymer and lignin is comprised between 2.5 and 160 phr, more preferably between 5 and 130 phr, and even more preferably between 10 and 100 phr.

In this way, it is advantageously possible to have a vulcanizable elastomeric composition having the most suitable lignin concentration as a function of the application requirements.

Preferably, the aforementioned vulcanizable elastomeric composition is advantageously vulcanized to obtain at least one structural element of the tyre for vehicle wheels according to the invention, as will be described in more detail hereinafter.

The Predispersion of Elastomeric Diene Polymer and Lignin

Preferably, the elastomeric diene polymer of the predispersion according to the present invention is any elastomeric diene polymer which occurs in an emulsion.

More preferably, the elastomeric diene polymer is selected from natural rubber (NR), emulsion styrene butadiene rubber (ESBR), carboxylated styrene butadiene rubber (XSBR), nitrile rubber NBR, carboxylated nitrile rubber (XNBR), chloroprene rubber (CR), butyl rubber (IIR).

Preferably, the predispersion of elastomeric diene polymer and lignin comprises an amount of lignin equal to or greater than about 45 phr, preferably equal to or greater than about 50 phr, even more preferably equal to or greater than about 60 phr up to a maximum value of about 160 phr.

In this way, it is advantageously possible to have a predispersion with a high lignin content that allows to achieve a high formulation flexibility of the vulcanizable elastomeric composition according to the tyre component that it is wished to produce.

Preferably, the lignin is selected from the group comprising Softwood Kraft lignin, Hardwood Kraft lignin, Soda Grass lignin, Wheat Straw lignin, Rice Husk lignin, lignin obtained through biorefinery processes, Organosolv lignin.

The predispersion of elastomeric diene polymer and lignin according to the present invention, in addition to being advantageously usable in the process for the production of a tyre for vehicle wheels, is also particularly advantageous with regard to storage and transportation aspects of the lignin and can be stored or sent directly to the subsequent production steps of the tyre according to the present invention immediately after its production.

The Process for Preparing a Predispersion of an Elastomeric Diene Polymer and Lignin In a preferred embodiment, the dispersant liquid used in the preparation of the predispersion of elastomeric diene polymer and lignin is an aqueous dispersant liquid, more preferably deionized water.

In a preferred embodiment, step a) of providing said first lignin suspension comprises (a) providing in the dispersant liquid a first lignin suspension having a value of a median particle diameter D50 equal to or less than 5 microns, more preferably, equal to or less than 2 microns.

In a particularly preferred embodiment, step a) of providing said first lignin suspension comprises a1) providing in the dispersant liquid a coarse lignin suspension having a value of a median particle diameter D50 equal to or greater than 10 microns, more preferably, equal to or greater than 20 microns;

(a2) wet-grinding the lignin particles contained in said coarse suspension until the median diameter D50 of the lignin particles is reduced to said value equal to or less than 10 microns.

In this preferred embodiment, therefore, the lignin of the first lignin suspension obtained from step a) that is mixed with the elastomeric diene polymer latex is a ground lignin.

In preferred embodiments, in the process for preparing a predispersion of an elastomeric diene polymer and lignin according to the invention, step a) of providing the first lignin suspension or step a1) of providing the coarse lignin suspension comprises adding a dosed amount of at least one surfactant to said suspension.

Indeed, the Applicant has found that thanks to the addition of at least one surfactant, it is possible to provide a lignin suspension (first or coarse) that is stable and capable to facilitate the subsequent steps of mixing with the elastomeric diene polymer latex and possibly of wet-grinding the coarse lignin suspension.

Preferably, the surfactant is an anionic surfactant, such as sodium lauryl sulfate (SLS), lauryl ethoxy sulfate (LES), alkyl benzene sulfonic acids (ABS) and salts thereof. More preferably, the surfactant is sodium dodecylbenzenesulfonate, a widely available low-cost anionic surfactant.

Preferably, step a) of providing the first lignin suspension or step a1) of providing the coarse lignin suspension comprises adding to the first lignin suspension an amount of surfactant comprised between 0.1 and 60 parts by weight, preferably between 1 and 10 parts by weight, per 100 parts by weight of total suspension.

In this way, it is advantageously possible to provide a lignin suspension or a coarse lignin suspension which is particularly stable and capable to facilitate the subsequent steps of mixing with the elastomeric diene polymer latex and possibly of wet-grinding the coarse lignin suspension.

Preferably, the first lignin suspension or the aforementioned coarse lignin suspension has a solid residue comprised between 20% and 80% by weight, preferably between 30% and 70% by weight, with respect to the total weight of the suspension.

In this way, it is advantageously possible to have a lignin concentration in the coarse suspension that allows to carry out in the best way both step a) of providing the first lignin suspension, and steps a2) of wet-milling and b) of mixing with the elastomeric diene polymer latex.

In a preferred embodiment, the coarse lignin suspension may be obtained by diluting lignin having a moisture content of between 1 and 60% with a suitable amount of liquid dispersant in order to obtain a suspension having a solid residue comprised between 20% and 80% by weight, more preferably comprised between 30% and 70% by weight with respect to the total weight of the coarse suspension.

Preferably, step a2) of the aforementioned preferred process for preparing the predispersion provides for wet-grinding the lignin particles contained in the coarse lignin suspension until the median diameter D50 of the lignin particles is reduced to a value equal to or less than 5 microns, more preferably, equal to or less than 2 microns.

Preferably, the first lignin suspension obtained from step a) has a % by weight of particles having a size greater than 10 microns equal to or less than 10% by weight, more preferably equal to or less than 2% by weight.

In a preferred embodiment, this particle size profile may be obtained from step a2) by wet-grinding the lignin particles contained in the coarse suspension.

The Applicant has found that in this way it is advantageously possible to achieve optimal lignin dispersion properties in the vulcanizable elastomeric composition and optimal lignin reinforcement properties in the vulcanized elastomeric material.

In a preferred embodiment, step a2) of wet-grinding the lignin particles contained in the coarse lignin suspension is carried out by means of a grinding apparatus selected from ball mills, hammer mills, blade mills, roller mills, high-pressure compression mills, ring mills, vibrating tube or vibrating rod mills, centrifugal fluid mills, preferably ball mills.

In this way, it is advantageously possible to have an effective action of reduction of the lignin particle size without altering their chemical-physical characteristics.

Preferably, the elastomeric diene polymer latex has a solid residue comprised between 10% and 80% by weight, preferably between 50% and 70% by weight, with respect to the total weight of the latex.

In this way, it is advantageously possible to have a suitable concentration of elastomeric diene polymer to have the correct amount of polymeric component in the final predispersion obtained.

Preferably, the elastomeric diene polymer latex is stabilized with a weak base, for example ammonia.

Preferably, step (b) of providing the second suspension comprising lignin and elastomeric diene polymer latex is carried out by mixing from 30 to 200 parts by weight, preferably from 60 to 140 parts by weight, of the first lignin suspension obtained from step a) per 100 parts by weight of elastomeric diene polymer latex.

In this way, it is advantageously possible to have the most appropriate lignin concentration in an elastomeric diene polymer matrix in the final predispersion obtained.

In a particularly preferred embodiment, step b) of providing the second suspension comprising lignin and elastomeric diene polymer latex is carried out by mixing the first lignin suspension obtained from step a) with said latex for a time suitable to obtain a substantially homogeneous second suspension.

Preferably, the mixing time is between 5 minutes and 120 minutes.

In a preferred embodiment, the mixing provided for in step b) is carried out using a batch mixer with a mechanical stirrer.

In this way, it is advantageously possible to obtain a substantially homogeneous predispersion of lignin and elastomeric diene polymer, which allows to optimize the dispersion of lignin in the vulcanizable elastomeric composition and the reinforcing properties exerted by the lignin in the vulcanized elastomeric material.

Preferably, step c) of removing the dispersant liquid from the second suspension comprising lignin and elastomeric diene polymer latex comprises d) drying the second suspension.

Preferably, step d) of drying said second suspension comprising lignin and elastomeric diene polymer latex is carried out until a moisture content of the predispersion of elastomeric diene polymer and lignin is brought to a value equal to or less than 5% by weight, preferably equal to or less than 1% by weight.

In this way, it is advantageously possible to obtain a predispersion of lignin and elastomeric diene polymer that can be usefully and advantageously used in the usual processes for preparing vulcanizable elastomeric compositions used in the manufacture of a tyre.

Preferably, step d) of drying the second suspension comprising lignin and elastomeric diene polymer latex is carried out in a static oven at a temperature comprised between 40 and 120° C., for example 60° C., for a time comprised between 2 and 30 hours.

In an alternative embodiment, step (c) of removing the dispersant liquid from the second suspension comprising lignin and elastomeric diene polymer latex may comprise a step e) of removing part of the dispersant liquid, for example by filtration or centrifuging or decanting, before drying said second suspension.

In a preferred embodiment, the process for preparing the predispersion of elastomeric diene polymer and lignin may comprise a step f) of compacting the predispersion of elastomeric diene polymer and lignin obtained from step c).

Advantageously, this compacting step can be carried out by means of apparatuses normally used in the rubber industry, such as for example an open mill or an internal mixer.

In this way, it is possible to obtain a semi-finished product in the form of a sheet that can subsequently be used in the production operations of the vulcanizable elastomeric composition, which will be discussed in greater detail hereinafter.

Alternatively, the predispersion of elastomeric diene polymer and lignin can be used in the form of bales as conventionally happens in the case of emulsion elastomeric polymer compositions.

The Process for Producing the Vulcanizable Elastomeric Composition

Preferably, the mixing apparatus used to mix and disperse the components of the vulcanizable elastomeric composition may comprise at least one discontinuous mixer and/or at least one continuous mixer.

Within the framework of the present description and of the subsequent claims, the term "batch (or discontinuous) mixer (or mixing device)" indicates a mixing device configured to be periodically fed with the various ingredients of the material to be prepared in predetermined quantities and to mix them for a predetermined time so as to obtain a batch of said material.

At the end of the mixing step, the entire batch of material obtained is completely discharged from the mixing device in a single operation. Examples of batch or discontinuous mixers are internal mixers of the type with tangential rotors (Banbury®) or with interpenetrating rotors (Intermix®).

Within the framework of the present description and of the subsequent claims, the term "continuous mixer (or mixing device)" indicates a mixing device configured to receive in a continuous feed the ingredients of the material to be prepared, typically by means of controlled dosing dosers, to mix the ingredients in order to produce the material and to discharge the same in a continuous stream (except for possible stops of the mixing device due to maintenance, or change of the material recipe).

In the jargon of the field of mixers for elastomeric compounds, the continuous mixing device is sometimes referred to as: 'mixing extruder', which is considered herein to be equivalent to 'continuous mixer'.

The continuous mixer (in particular its active elements such as the screws or the mixing satellites) is therefore provided with mixing portions capable of giving the material being mixed a high shear stress, and, interspersed with the mixing portions, with conveying portions capable of giving a thrust to the material being processed for its advancement from one longitudinal end to the other of the inner chamber. It can also be provided with possible redistribution portions.

Examples of continuous mixing devices are twin-screw or multi-screw (for example ring mixers), interpenetrating and co-rotating, or planetary type mixers.

Both the discontinuous mixer and the continuous mixer are able to provide the material to be produced with them with sufficient energy to homogeneously mix and disperse the various components even in the case of cold feeding of the ingredients and, in the case of a material comprising an elastomeric component, to masticate the elastomeric mixture, raising its temperature so as to make it workable and plastic to facilitate the incorporation and/or distribution of the ingredients within the elastomeric polymeric matrix.

The vulcanizable elastomeric composition thus obtained can then be stored or directly sent to the subsequent production steps of the tyre according to the present invention.

The predispersion of an elastomeric diene polymer and lignin may be fed to said at least one batch mixer and/or to at least one continuous mixer according to any manner known to those skilled in the art and suitable for the purpose.

For example, the predispersion according to the present invention may be fed in the form of baled or sheet material obtained as described above in the predispersion preparation process.

Advantageously and as outlined above, the feeding of the predispersion according to the present invention facilitates and improves the dispersion of the lignin in the elastomeric composition, thereby improving the reinforcing effect carried out by the lignin itself.

The Tyre

Preferably, the structural element of the tyre according to the invention is selected from the group comprising tread band, carcass structure, belt structure, underlayer, antiabrasive strip, sidewall, sidewall insert, mini-sidewall, flipper, chafer, underliner, rubber layers, bead filling and rubber sheets.

Preferably, in the tyre according to the invention at least the tread band and at least one component selected from the underlayer, antiabrasive strip, sidewall, sidewall insert, mini-sidewall, flipper, chafer, underliner, rubber layers, bead filling or rubber sheets comprise said vulcanized elastomeric material obtained by vulcanizing a vulcanizable elastomeric composition comprising the predispersion of elastomeric diene polymer and lignin according to the invention.

An embodiment according to the present invention relates to a vehicle tyre comprising at least:

- a carcass structure comprising at least one carcass layer having opposite side edges associated to respective bead structures;
- a belt structure applied at a radially outer position with respect to the carcass structure,
- a tread band applied at a radially outer position with respect to said belt structure, and possibly at least
- an underlayer and/or an antiabrasive strip and/or a sidewall and/or a sidewall insert and/or a mini-sidewall and/or an underliner and/or a rubber layer and/or a flipper and/or a chafer and/or a bead filling and/or a rubber sheet,
- wherein at least one of said tread band and/or carcass structure and/or belt structure and/or underlayer and/or antiabrasive strip and/or sidewall and/or sidewall insert and/or mini-sidewall and/or underliner and/or rubber layer and/or flipper and/or chafer and/or bead filling and/or rubber sheet, comprises a vulcanized elastomeric material obtained by vulcanizing a vulcanizable elastomeric composition comprising the predispersion of elastomeric diene polymer and lignin according to the invention.

Preferably, the tyre according to the invention comprises a vulcanized elastomeric material obtained by vulcanizing a vulcanizable elastomeric composition comprising the predispersion of elastomeric diene polymer and lignin according to the invention at least in the tread band.

Preferably, the tyre according to the invention comprises a vulcanized elastomeric material obtained by vulcanizing a vulcanizable elastomeric composition comprising the predispersion of elastomeric diene polymer and lignin according to the invention in the tread band and/or in one or more components selected from the underlayer, antiabrasive strip, sidewall, sidewall insert, mini-sidewall, underliner, rubber layers, bead filling and rubber sheet.

The tyre according to the invention can be used on two- or four-wheeled vehicles.

The tyre according to the invention can be for summer or winter use or for all seasons.

BRIEF DESCRIPTION OF THE FIGURES

Additional features and advantages of the invention will become more readily apparent from the following description of some preferred embodiments thereof, made hereinafter for exemplifying and not limiting purposes, with reference to the attached drawings.

In the Drawings:

FIGS. 2A and 2B illustrate respective microphotographs taken, on thin sections (50 nm) obtained in cold conditions (−120° C.) by means of an ultramicrotome, with a FESEM Ultra Plus Zeiss microscope, Gemini column, in InLens mode, electron beam excitation of 30 KV, working distance 2 mm, in which lignin particles are visible in a comparative vulcanizable elastomeric material (Example 2, material E) and in a vulcanizable elastomeric material according to the invention (Example 2, material C).

DETAILED DESCRIPTION OF CURRENTLY PREFERRED EMBODIMENTS

Figure 1:
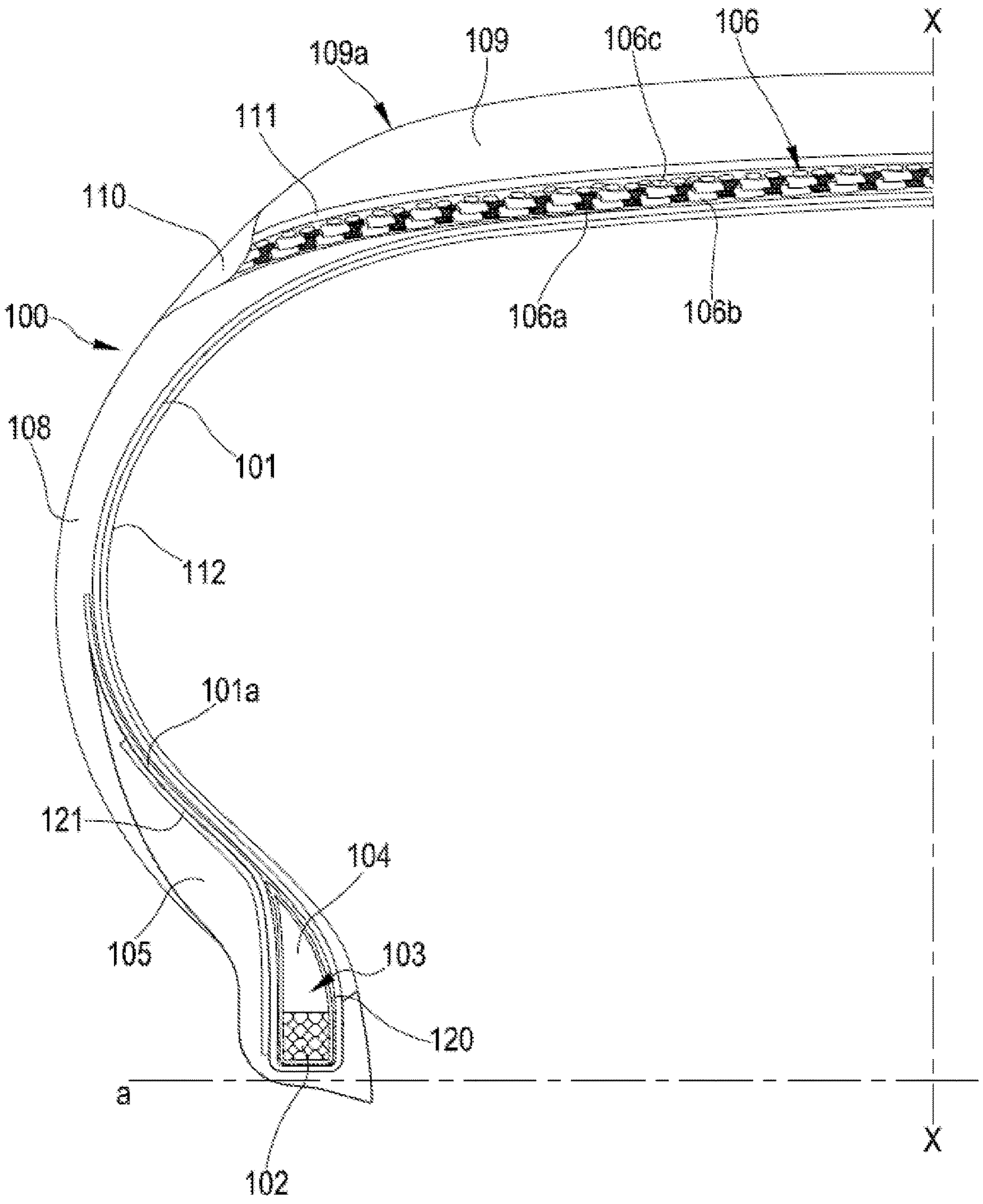
FIG. 1 illustrates a radial half-section of a tyre for vehicle wheels according to the invention.

A tyre for vehicle wheels according to a preferred embodiment of the invention is generally indicated with reference numeral 100 in FIG. 1.

FIG. 1 illustrates a tyre for vehicle wheels in radial half-section.

In FIG. 1 "a" indicates an axial direction and "X" indicates a radial direction, in particular X-X indicates the trace of the equatorial plane. For the sake of simplicity, FIG. 1 shows only a portion of the tyre, the remaining portion not represented being identical and arranged symmetrically with respect to the equatorial plane "X-X".

The vehicle tyre 100 comprises at least one carcass structure, comprising at least one carcass layer 101 having respectively opposite end flaps engaged with respective annular anchoring structures 102, called bead cores, possibly associated with a bead filling 104.

The area of the tyre comprising the bead core 102 and the filling 104 forms a bead structure 103 intended for anchoring the tyre on a corresponding mounting rim, not illustrated.

The carcass structure is usually of the radial type, i.e. the reinforcing elements of the at least one carcass layer 101 are located in planes comprising the rotating axis of the tyre and being substantially perpendicular to the equatorial plane of the tyre. Said reinforcing elements generally consist of textile cords, for example rayon, nylon, polyester (for example polyethylene naphthalate, PEN). Each bead structure is associated to the carcass structure by folding back the opposite lateral edges of the at least one carcass layer 101 around the annular anchoring structure 102 so as to form the so-called carcass flaps 101*a* as illustrated in FIG. 1.

In an embodiment, the coupling between carcass structure and bead structure may be provided by a second carcass layer (not represented in FIG. 1) applied at an axially outer position with respect to the first carcass layer.

An antiabrasive strip 105 is arranged at an outer position of each bead structure 103.

A belt structure 106 comprising one or more belt layers 106*a*, 106*b* placed in radial juxtaposition with respect to each other and with respect to the carcass layer, having typically textile and/or metallic reinforcing cords incorporated in a layer of vulcanized elastomeric material, is associated to the carcass structure.

Such reinforcing cords may have crossed orientation with respect to a direction of circumferential extraction of the tyre 100. The term "circumferential" direction is used to indicate a direction generically directed in the direction of rotation of the tyre.

At a radially outer position with respect to the belt layers 106*a*, 106*b*, at least one zero-degree reinforcing layer 106*c*, commonly known as a "0° belt", may be applied, which generally incorporates a plurality of elongated reinforcing elements, typically metal or textile cords, oriented in a substantially circumferential direction, thereby forming an angle of a few degrees (for example an angle between about 0° and 6°) with respect to a direction parallel to the equatorial plane of the tyre, and coated with vulcanized elastomeric material.

A tread band 109 made of vulcanized elastomeric material is applied at a radially outer position with respect to the belt structure 106.

On the lateral surfaces of the carcass structure, each extending from one of the lateral edges of the tread band 109 up to the respective bead structure 103, respective sidewalls 108 made of vulcanized elastomeric material are also applied at an axially outer position.

At a radially outer position, the tread band 109 has a rolling surface 109*a* intended to come into contact with the ground. Circumferential grooves, which are connected by transverse notches (not shown in FIG. 1) so as to define a plurality of blocks of various shapes and sizes distributed on the rolling surface 109*a*, are generally made in this surface 109*a*, which in FIG. 1 is represented smooth for the sake of simplicity.

An underlayer 111 made of vulcanized elastomeric material may be arranged between the belt structure 106 and the tread band 109.

A strip 110 of vulcanized elastomeric material, commonly known as a "mini-sidewall", may optionally be present in the connection area between the sidewalls 108 and the tread band 109.

This mini-sidewall 110 is generally obtained by co-extrusion with the tread band 109 and advantageously allows an improved mechanical interaction between the tread band 109 and the sidewalls 108.

Preferably, the end portion of the sidewall 108 (in the preferred embodiment illustrated in FIG. 1, of the mini-sidewall 110) directly covers the lateral edge of the tread band 109.

In the case of tubeless tires, a layer of rubber 112, generally known as a "liner", which provides the necessary tightness to the inflation air of the tyre, may also be provided at a radially inner position with respect to the carcass layer 101.

A further sheet of vulcanized elastomeric material, not illustrated, also known as "underliner", may also be arranged between the rubber layer 112 and the carcass layer 101.

The rigidity of the tyre sidewall 108 may be improved by providing the bead structure 103 with a reinforcing layer 120 generally known as a "flipper" or additional strip-shaped insert.

The flipper 120 is a reinforcing layer that is wound around the respective bead core 102 and bead filling 104 so as to at least partially surround them, said reinforcing layer being arranged between the at least one carcass layer 101 and the bead structure 103.

Preferably, the flipper is in contact with the aforementioned at least one carcass layer 101 and bead structure 103.

The flipper 120 typically comprises a plurality of textile cords incorporated in a layer of vulcanized elastomeric material.

The bead structure 103 of the tyre may comprise an additional protective layer 121, generally known as a "chafer" or protective strip, which has the function of increasing rigidity and integrity of the bead structure 103.

Preferably, the protective layer 121 or "chafer" comprises a plurality of cords incorporated in a layer of vulcanized elastomeric material. Such cords may be made of textile materials (for example aramid or rayon) or metallic materials (for example steel cords).

A layer or sheet of elastomeric material, not illustrated, may be arranged between the belt structure 106 and the carcass structure. The layer may have a uniform thickness.

Alternatively, the layer may have a variable thickness in the axial direction. For example, the layer may have a greater thickness close to its axially outer edges with respect to the central (crown) area.

Advantageously, the layer or sheet may extend over an area substantially corresponding to the surface of development of the belt structure 106.

In a preferred embodiment, a layer or sheet of elastomeric material as described above, not illustrated, may be arranged—as an alternative or in addition to the underlayer 111—between the belt structure 106 and the tread band 109, said additional layer or sheet preferably extending over a surface substantially corresponding to the surface of development of the belt structure 106.

The vulcanized elastomeric material obtained by vulcanizing the vulcanizable elastomeric composition comprising the predispersion of elastomeric diene polymer and lignin according to the present invention may be advantageously incorporated in one or more of the structural elements of the tyre 100 described above.

Preferably, the structural element of the tyre 100 comprising a vulcanized elastomeric material obtained by vulcanizing the vulcanizable elastomeric composition comprising the predispersion of elastomeric diene polymer and lignin according to the present invention may be one or more of tread band 109, carcass structure, belt structure 106, underlayer 111, antiabrasive strip 105, sidewall 108, sidewall insert, mini-sidewall 110, flipper 120, chafer 121, underliner, rubber layers, bead filling 104, and sheets of vulcanized elastomeric material.

The tyre according to the invention may be a tyre for automobiles, i.e. including both tyres for motor cars, such as for example the high-performance tyres defined below, and tyres for light transportation vehicles, for example wagons, vans, camper vans, pick-up trucks, typically with a fully-laden mass equal to or less than 3500 kg. Tyres for heavy duty vehicles are thus excluded.

The term “high performance tyres” is used to indicate tyres typically intended to be used in wheels of high and ultra-high performance cars. Such tyres are commonly referred to as “HP” or “UHP” tyres and they allow to reach speeds in excess of 200 km/h, up to over 300 km/h. Examples of such tyres are those belonging to classes “T”, “U”, “H”, “V”, “Z”, “W”, “Y”, according to the E.T.R.T.O. (European Tyre and Rim Technical Organisation) standard and racing tyres, in particular for high-power four-wheeled vehicles. Typically, the tyres belonging to such classes have a section width equal to or greater than 185 mm, preferably comprised between 195 mm and 385 mm, more preferably comprised between 195 mm and 355 mm. Such tyres are preferably mounted on rims having fitting diameters equal to or greater than 330.2 mm (13 inches), preferably not exceeding 609.6 mm (24 inches), more preferably comprised between 406.4 mm (16 inches) and 584.2 mm (23 inches).

Such tyres can also be used on vehicles other than the aforementioned automobiles, for example on high-performance sport motorcycles, i.e. motorcycles capable of reaching speeds even over 270 km/h. Such motorcycles are those that belong to the category typically identified with the following classifications: hypersport, supersport, sport touring, and for lower speeds: scooter, street/enduro and custom.

The term “tyre for motorcycle wheels” is used to indicate a tyre having a high ratio of curvature (typically greater than 0,200), capable of reaching high camber angles (roll angles) when cornering a motorcycle.

The invention will now be described by means of some Examples to be understood as being intended for illustrating and not limiting purposes thereof.

Example 1

Preparation of Predispersions of an Elastomeric Diene Polymer and Lignin Comprising 60 phr, 75 phr and 100 phr of Lignin

Materials

- Lignin: lignin from Softwood Kraft UPM BioPiva™ 200 process (UPM Biochemicals) having a median particle diameter D50 equal to or greater than 20 microns;
- elastomeric diene polymer: natural rubber from HA latex obtained by centrifuging and stabilized with ammonia (60% by weight—commercialized by Von Bundit Co. Ltd.);
- anionic surfactant: sodium dodecylbenzenesulfonate technical grade, Thermo Fischer Scientific.

Predispersion 1 (60 phr of Lignin)

The process for preparing the predispersion was as follows.

Step a1): 50 kg of wet lignin particulate (solid content about 57%, starting D50 about 20 microns) were diluted in 50 kg of deionized water; subsequently, 1.5 kg of anionic surfactant was added and the mixture was stirred until homogeneous, thus obtaining 101.5 kg of a coarse lignin suspension SG having a solid lignin content of about 28% by weight.

Step a2): the lignin particles contained in the coarse lignin suspension SG were wet-ground in a cylindrical mill model ZETA by NETZSCH (NETZSCH-Feinmahltechnik GmbH, Selb, Germany) using steel balls with a diameter of less than 4 mm in order to reduce the median diameter D50 of the lignin particles to a value equal to or less than 1.5 microns. Thus, 101.5 kg of a first suspension S1 containing ground lignin (28% by weight) was obtained in which the percentage of particles larger than 10 microns was less than about 2% by weight.

The median particle diameter D50 was measured with Malvern Mastersizer 2000 laser analyzer (Malvern Panalytical Ltd., Malvern, Great Britain).

Step b): the first suspension S1 containing ground lignin obtained from step a2) (101.5 kg) was mixed with 83.3 kg of natural rubber latex (solid content: 60% by weight) by means of a mechanical stirrer, thus obtaining 184.8 kg of a second suspension S2 containing about 15% by weight of ground lignin and about 21% by weight of natural rubber.

Step c): the second suspension S2 containing ground lignin and natural rubber (184.8 kg) was then dried in a static oven at 60° C. for a time equal to about 4 hours until a moisture content of less than 1% by weight was reached.

The predispersion in flakes thus obtained was then subjected to a further compacting step by means of an open mixer with rollers spaced by about 3 mm to obtain a predispersion or masterbatch in sheets of natural rubber and lignin at 40% by weight (60 phr).

Predispersion 2 (75 phr of Lignin)

For the preparation of this predispersion the same procedure as for Predispersion 1 was followed, using in step b) 68.8 kg of natural rubber latex so as to vary the amount of lignin incorporated in the final predispersion, in this case containing natural rubber and lignin at 45% by weight (75 phr).

Predispersion 3 (100 phr of Lignin)

For the preparation of this predispersion the same procedure as for Predispersion 1 was followed, using in step b) 62.5 kg of natural rubber latex so as to vary the amount of lignin incorporated in the final predispersion, in this case containing natural rubber and lignin at 50% by weight (100 phr).

Example 2

Preparation of Vulcanizable Elastomeric Materials (Invention, Reference and Comparative)

The predispersions 1-3 containing lignin according to Example 1 were used to prepare vulcanizable elastomeric materials for a tread band in amounts of 10 phr, 23.4 and 20 phr, materials (A), (B) and (C), respectively. These elastomeric materials were compared with:

- material (D): reference—conventional vulcanizable elastomeric material devoid of lignin, taken as a reference (model elastomeric composition for structural elements of tyres, in particular of tread bands);
- material (E): comparative—Vulcanizable elastomeric material including lignin powder from the Softwood Kraft UPM BioPiva™ 200 process (UPM Biochemicals) having a median particle diameter D50 equal to or greater than 20 microns; and (material F): comparative—vulcanizable elastomeric material including lignin powder having a median particle diameter D50 equal to about 1.5 microns obtained by drying the first suspension S1 obtained from step a2) according to the preparation procedure of predispersion 3 of example 1. Specifically, in this ground lignin powder, the percentage of particles larger than 10 microns was less than about 2% by weight.

In particular, the drying of the first suspension S1 containing ground lignin was carried out by means of a static oven at a temperature of 60° C. for a time of about 2 hours so as to reduce the moisture content to about 1%.

It should be noted that the comparative material F therefore comprises a same type of lignin with the same particle size, but in powder form, as the materials A-C obtained using predispersions 1-3 according to the invention of Example 1 (60, 75 and 100 phr of lignin). On the other hand, the amount of lignin is equal to that of material C according to the invention.

In order to have homogeneity of comparison, all these vulcanizable elastomeric materials are based on the model elastomeric composition for tyre structural elements, in particular tread bands (material D).

Therefore, the results shown by these materials are predictive of those obtainable on a tyre.

Table 1 below shows the compositions in phr of the vulcanizable elastomeric materials (A), (B), (C), (D), (E) and (F).

In Table 1, the values (in phr) of the amount of lignin actually contained in the elastomeric materials, irrespective of the physical dosage form, predispersion or powder, of the lignin have also been shown in brackets. The values indicated in brackets are not to be added to the total phr calculation but serve only as a reference.

TABLE 1

| | (A) invention | (B) invention | (C) invention | (D) reference | (E) comparative | (F) comparative |
|---|---|---|---|---|---|---|
| NR | 27 | 19.6 | 23 | 33 | 33 | 33 |
| S-SBR | 67 | 67 | 67 | 67 | 67 | 67 |
| TESPT | 6.4 | 6.4 | 6.4 | 6.4 | 6.4 | 6.4 |
| Silica | 69 | 66 | 66 | 72 | 66 | 66 |
| Predispersion 1 | 10 | | | — | — | — |
| Predispersion 2 | — | 23.4 | — | — | — | — |
| Predispersion 3 | — | — | 20 | — | — | — |
| Lignin powder | — | — | — | — | 10 | — |
| Ground lignin powder | | | | — | — | 10 |
| Actual lignin | (4) | (10) | (10) | (0) | (10) | (10) |
| Wax | 1.7 | 1.7 | 1.7 | 1.7 | 1.7 | 1.7 |
| TDAE oil | 8 | 8 | 8 | 8 | 8 | 8 |
| Resin | 5.5 | 5.5 | 5.5 | 15.5 | 5.5 | 5.5 |
| Zn octanoate | 4 | 4 | 4 | 4 | 4 | 4 |
| TMQ | 1.5 | 1.5 | 1.5 | 1.5 | 1.5 | 1.5 |
| 6PPD | 3 | 3 | 3 | 3 | 3 | 3 |
| TBBS | 3 | 3 | 3 | 3 | 3 | 3 |
| Soluble Sulfur | 1 | 1 | 1 | 1 | 1 | 1 |

Materials

- NR: coagulated natural rubber, obtained by coagulation of HA natural rubber latex obtained by centrifuging and stabilized with ammonia (60% by weight—commercialized by Von Bundit Co. Ltd.);
- S-SBR: SPRINTAN SLR4602, Trinseo;
- TESPT: bis(3-triethoxysilylpropyl) tetrasulfide, Si69®;
- Silica: Ultrasil 7000 Silica, Evonik;
- Predispersion 1: Natural rubber predispersion prepared according to Example 1 comprising 60 phr of lignin according to Example 1;
- Predispersion 2: Natural rubber predispersion prepared according to Example 1 comprising 75 phr of lignin according to Example 1;
- Predispersion 3: Natural rubber predispersion prepared according to Example 1 comprising 100 phr of lignin according to Example 1;
- Lignin powder: Softwood lignin UPM Biopiva™ 200, UPM Biochemicals;
- Powdered lignin: Softwood lignin UPM Biopiva™ 200 (UPM Biochemicals) wet-ground according to what is stated in Example 1 and dried to about 1% moisture content;
- Wax: Riowax BM 01, SER;
- Oil: Vivatec 500, Global Asia;
- Resin Krystalex F-85, Eastman;
- Zn octanoate: Struktol Aktivator 73, Struktol;
- TMQ: Polymerized 2,2,4-trimethyl-1,2-dihydroquinoline, Kemai;
- 6PPD: N-(1,3-dimethylbutyl)-N'-phenyl-p-phenylenediamine, Solutia Eastman;
- TBBS: N-tert-butyl-2-benzothiazylsulfenamide, Vulkacit® NZ/EGC, Lanxess;
- Soluble Sulfur: S8 (soluble sulphur), Zolfo Industria.

Procedure

All components except sulfur and vulcanization accelerant (TBBS) were mixed in an internal mixer (Brabender) for about 10 minutes (1st step).

When the temperature of 135° C. was reached, the material was mixed for another minute and then it was discharged. The unfinished compound was left to stand for a day then the sulfur, the accelerant (TBBS) was added and mixing was carried out in the same mixer at about 60° C. for 9 minutes (2nd step).

In FIGS. 2A and 2B two microphotographs obtained by FESEM Microscopy of the vulcanizable elastomeric materials (C) according to the invention and (E) comparative visually showing the distribution of the lignin particles are shown for illustrative purposes.

As it may be inferred from the microphotograph 2A of the comparative vulcanizable elastomeric material (E) obtained by dosing lignin powder, the lignin is present in the material in the form of relatively large and spaced particles, with a few submicrometric fragments. This is indicative of the fact that mechanical stirring in the presence of rubber is by itself neither sufficient to significantly reduce the size of the starting lignin nor to distribute it uniformly in the polymer matrix.

Conversely and as can be deduced from the microphotograph 2B of the vulcanizable elastomeric material (C) according to the invention obtained by dosing the predispersion 3, the lignin is present in the material in the form of relatively small particles of micrometric or sub-micrometric size and distributed substantially uniformly in the polymeric matrix.

This substantially uniform distribution of micrometric or sub-micrometric lignin particles is predictive of comparable or improved mechanical properties of the vulcanized elastomeric materials according to the invention with respect to the reference lignin-free vulcanized elastomeric material as will become clearer hereinafter.

Example 3

Characterization of the Vulcanizable Elastomeric Materials (A), (B), (C), (D), (E) and (F) after Vulcanization The vulcanizable elastomeric materials (A), (B), (C), (D), (E) and (F) were vulcanized at 170° C. for 10 min in order to be able to measure their static mechanical properties.

Static Mechanical Properties

The static mechanical properties of the vulcanizable elastomeric materials (A), (B), (C), (D), (E) and (F) were evaluated according to the ISO 37-2011 standard at 23° C., on 5 Dumbell test pieces. In this way, the following parameters were measured:

- load at 100% elongation (Ca1),
- load at 300% elongation (Ca3),
- load at break (CR), and
- elongation % at break (AR).

Dynamic Mechanical Properties Under Torsion

The dynamic mechanical properties of dynamic shear modulus G' and Tan delta of the vulcanizable elastomeric materials (A), (B), (C), (D), (E) and (F) were evaluated using an Alpha Technologies R.P.A. oscillating chamber rheometer. 2000 (Rubber Process Analyser) with chamber geometry as described in ASTM D6601-19 FIG. 1, applying the following method.

An approximately cylindrical test sample having a volume of between 4.6 and 5 $cm^3$ is obtained by punching a sheet having a thickness of at least 5 mm of the green vulcanizable elastomeric composition to be characterized;

Subsequently, the chambers of the R.P.A. 2000 are preliminarily preheated to 170° C.

The sample is loaded between the chambers of the rheometer and the chambers are closed. Between the sample of the green vulcanizable elastomeric composition and each chamber of the rheometer two films are arranged to protect the chamber itself: in contact with the compound a film of Nylon 6.6 cast with a thickness of about 25 microns and in contact with the chamber of the rheometer a film of polyester with a thickness of about 23 microns. The sample is then vulcanized for a fixed time of 10 min at a temperature of 170° C. while at the same time recording the vulcanization curve, i.e. subjecting the sample for the entire time of vulcanization to a sinusoidal deformation of 7% amplitude and 1.67 Hz frequency.

The temperature of the rheometer chambers is then brought to 70° C. After a total time of 10 minutes from when the temperature of the chambers is set at 70° C., a sequence of dynamic measurements is carried out at a constant temperature of 70° C. by sinusoidally stressing the sample under torsion at a fixed frequency of 10 Hz and progressively increasing amplitude from 0.3% to 10% by carrying out 10 stabilization cycles and 10 measurement cycles for each condition.

Always keeping the temperature of the rheometer chambers at 70° C., a dynamic measurement is then carried out by sinusoidally stressing the sample under torsion at a fixed frequency of 10 Hz and an amplitude of 9%, carrying out 10 stabilization cycles and 20 measurement cycles.

In this way, the following parameters were measured as an average of what was recorded in the 20 measurement cycles:

dynamic elastic shear modulus G', variation of the dynamic elastic shear modulus d_G' between an amplitude of the deformation of the sample of 0.5% and one of 10%;

tan delta under torsion, i.e. the ratio between the viscous elastic modulus G' and the dynamic elastic modulus G', at an amplitude of the deformation of 9% (hereinafter Tan delta (9%)).

Vulcanization Properties

During the tests for the evaluation of the dynamic mechanical properties under torsion and again by means of the aforementioned rheometer, the following vulcanization parameters of the vulcanizable elastomeric materials (A), (B), (C), (D), (E) and (F) were also measured:

minimum torque (ML), maximum torque (MH), vulcanization time necessary to reach 90% of maximum torque (T90), and vulcanization time necessary to reach a torque value 2 points higher than the minimum value (TS2).

Dynamic Mechanical Properties Under Traction-Compression

The dynamic mechanical properties under traction-compression of the vulcanizable elastomeric materials (A), (B), (C), (D), (E) and (F) were evaluated using an Instron model 1341 dynamic device in the traction-compression mode the following modes.

A test piece of vulcanized material (170° C. for 10 minutes) having a cylindrical shape (length=25 mm; diameter=18 mm), preloaded under compression up to a longitudinal deformation of 25% with respect to the initial length and kept at a predetermined temperature (for example 70° C.) for the entire duration of the test.

After a waiting time of 2 minutes followed by a mechanical pre-conditioning of 125 cycles at 100 Hz at 5% deformation amplitude with respect to the length under preload, the test piece was subjected to a dynamic sinusoidal stress having an amplitude of ±3.5% with respect to the length under preload, with a frequency of 100 Hz.

In this way, the following parameters were measured:

dynamic elastic modulus E', tan delta, i.e. the ratio between the viscous dynamic modulus E" and the dynamic elastic modulus E'.

Table 2 below shows the results obtained from the characterizations performed.

TABLE 2

| | (A) invention | (B) invention | (C) invention | (D) reference | (E) comparative | (F) comparative |
|---|---|---|---|---|---|---|
| Ca1 (MPa) | 2.44 | 2.63 | 2.42 | 2.39 | 2.29 | 3.27 |
| Ca3 (MPa) | 11.64 | 12.15 | 11.90 | 11.07 | 8.98 | 13.01 |
| CR (MPa) | 20.79 | 20.81 | 19.94 | 21.07 | 18.43 | 20.07 |
| AR (%) | 470.28 | 453.64 | 446.29 | 462.12 | 512.79 | 427.39 |
| ML (dNm) | 4.58 | 4.78 | 4.25 | 5.01 | 3.40 | 3.71 |
| MH (dNm) | 18.91 | 17.61 | 16.95 | 22.08 | 18.86 | 25.45 |
| T90 (min) | 5.72 | 5.98 | 5.90 | 5.64 | 5.02 | 4.82 |
| TS2 (min) | 2.70 | 2.80 | 2.85 | 2.44 | 1.63 | 1.43 |
| d_G' (MPa) | 0.80 | 0.58 | 0.57 | 1.06 | 1.15 | 1.21 |
| G' (MPa) | 1.60 | 1.51 | 1.43 | 1.88 | 1.79 | 1.99 |
| Tandelta (9%) | 0.120 | 0.109 | 0.113 | 0.122 | 0.139 | 0.151 |
| E' 0° C. (MPa) | 14.72 | 13.99 | 13.66 | 15.71 | 16.48 | 16.84 |
| Tandelta 0° C. | 0.657 | 0.666 | 0.658 | 0.653 | 0.656 | 0.616 |
| E' 23° C. (MPa) | 8.80 | 8.27 | 8.12 | 9.50 | 9.96 | 11.16 |
| Tandelta 23° C. | 0.301 | 0.304 | 0.298 | 0.305 | 0.322 | 0.327 |
| E' 70° C. (MPa) | 5.90 | 5.59 | 5.49 | 6.22 | 6.32 | 7.21 |
| Tandelta 70° C. | 0.118 | 0.117 | 0.121 | 0.120 | 0.134 | 0.140 |

From the analysis of the data shown in Table 2, it is clear that the vulcanizable elastomeric materials (A)-(C) according to the present invention respectively comprising 5 phr (material A) and 10 phr (materials B and C) of lignin added as a predispersion according to the invention, show:

- static mechanical properties after vulcanisation Ca1, Ca3 and CR, predictive of the rigidity of the tread band blocks of a tyre, comparable to or better than those of the reference material (D) and significantly better than those of the comparative material (E) incorporating commercial lignin powder;
- vulcanization properties ML, MH, T90 and TS2 comparable to those of the reference material (D);
- conversely, the comparative materials (E) and (F) display a very low TS2 value, indicative of possible problems of premature vulcanization;
- dynamic mechanical properties under torsion after vulcanization, G' and especially d_G', predictive of maneuverability (the better the lower the value of d_G'), typical of high performance tyres, for example HP and UHP tyres, better than those of the reference material (D) and significantly better than those of the comparative materials (E) incorporating commercial lignin powder and (F) incorporating ground lignin powder after drying;
- dynamic mechanical properties under traction-compression after vulcanization of dynamic elastic modulus E' at 0° C., predictive of the wet and/or cold road holding of a tyre (the better the lower the value of E' at this temperature), comparable to or better than those of the reference material (D) and significantly better than those of the comparative materials (E) incorporating commercial powdered lignin and (F) incorporating ground lignin powder after drying;
- dynamic mechanical properties under traction-compression after vulcanization of tan delta at 70° C., predictive of the rolling resistance of a tyre (the better the lower the tan delta value at this temperature), comparable to or better than those of the reference material (D) and significantly better than those of the comparative materials (E) incorporating commercial lignin powder and (F) incorporating ground lignin powder after drying.

In connection with the elastomeric material (F) incorporating powdered ground lignin obtained after drying in the same amount as the material (C) according to the invention, these tests have surprisingly shown that the same type of lignin subjected to the same type of grinding has markedly different reinforcing properties in the vulcanized elastomeric material depending on how it is dosed into the vulcanizable elastomeric composition.

As a matter of fact, if the lignin (for example obtained by wet-grinding) is incorporated in the vulcanizable elastomeric composition by means of a predispersion according to the invention (see measurements on compound C), there is a preservation or improvement of the dynamic mechanical properties under torsion or traction-compression with respect to the reference material (material D), whereas if lignin obtained by wet-grinding and with the same particle size is incorporated in the vulcanizable elastomeric composition in the form of powder, these same dynamic mechanical properties under torsion or traction-compression significantly deteriorate.

Without wishing to be bound by any interpretative theory, the Applicant believes that the step of mixing with an elastomeric diene polymer latex, for example and preferably natural rubber latex, leads to some interaction between the lignin particles in suspension with reduced particle size and the emulsion of the droplets of elastomeric diene polymer, which makes the predispersion subsequently obtained by physical means advantageously capable to homogeneously disperse the lignin in the polymeric matrix of the vulcanizable elastomeric composition thus obtaining optimal reinforcing properties in the vulcanized material.

Example 4

Preparation of Vulcanizable Elastomeric Materials (Invention, Reference and Comparative)

The lignin-containing predispersion 3 according to Example 1 was used to prepare vulcanizable elastomeric materials for an antiabrasive strip in amounts of 12 and 36 phr, materials (G) and (H) respectively. These elastomeric materials were compared with:

- material (I): reference—conventional vulcanizable elastomeric material devoid of lignin, taken as a reference (model elastomeric composition for structural elements of tyres, in particular antiabrasive strip);
- materials (L) and (M): comparative—vulcanizable elastomeric materials incorporating lignin powder with a median particle diameter D50 equal to about 20 microns, with two different lignin contents corresponding to the lignin content of materials (G) and (H).

All these vulcanizable elastomeric materials are based on a model elastomeric composition for structural tyre elements, in particular antiabrasive strip (material I).

Therefore, the results shown by these materials are predictive of those obtainable on a tyre.

Table 3 below shows the compositions in phr of the vulcanizable elastomeric materials (G), (H), (I), (L) and (M).

In Table 3, the values (in phr) of the amount of lignin actually contained in the elastomeric materials, irrespective of the physical dosage form, predispersion or powder, of the lignin have also been shown in brackets. The values indicated in brackets are not to be added to the total phr calculation but serve only as a reference.

TABLE 3

| | (G) invention | (H) invention | (I) reference | (L) comparative | (M) comparative |
|---|---|---|---|---|---|
| NR | 34 | 22 | 40 | 40 | 40 |
| BR | 60 | 60 | 60 | 60 | 60 |
| Lignin powder | — | — | — | 6 | 18 |
| Predispersion 3 | 12 | 36 | — | — | — |
| Actual lignin | (6) | (18) | (0) | (6) | (18) |
| Stearic acid | 2 | 2 | 2 | 2 | 2 |
| ZnO | 3 | 3 | 3 | 3 | 3 |
| Zn soap | 5 | 5 | 5 | 5 | 5 |
| CB | 68 | 61 | 68 | 68 | 61 |
| TMQ | 0.7 | 0.7 | 0.7 | 0.7 | 0.7 |

TABLE 3-continued

| | (G) invention | (H) invention | (I) reference | (L) comparative | (M) comparative |
|---|---|---|---|---|---|
| 6PPD | 2 | 2 | 2 | 2 | 2 |
| Bimodal wax | 0.5 | 0.5 | 0.5 | 0.5 | 0.5 |
| TBBS | 1.4 | 2 | 1.4 | 1.4 | 2 |
| PVI | 0.2 | 0.2 | 0.2 | 0.2 | 0.2 |
| Insoluble Sulfur | 4.35 | 4.35 | 4.35 | 4.35 | 4.35 |

Materials

NR: coagulated natural rubber, obtained by coagulation of HA natural rubber latex obtained by centrifuging and stabilized with ammonia (60% by weight—commercialized by Von Bundit Co. Ltd.);

BR: butadiene rubber BUNA CB 25, Lanxess; Lignin powder: Softwood lignin UPM Biopiva™ 200, UPM Biochemicals;

Predispersion 3: Natural rubber predispersion prepared according to Example 1 comprising 100 phr of lignin according to Example 1;

Stearic acid: Stearin, Undesa;

ZnO: Zinc Oxide, Zincol Ossidi;

Zn soap: Struktol 40 MS, Struktol;

CB: N550, Birla Carbon;

TMQ: Polymerized 2,2,4-trimethyl-1,2-dihydroquinoline, Kemai;

6PPD: N-(1,3-dimethylbutyl)-N'-phenyl-p-phenylenediamine, Solutia Eastman;

Bimodal wax: Riowax BM 01, SER;

TBBS: N-tert-butyl-2-benzothiazylsulfenamide, Vulkacit® NZ/EGC, Lanxess;

PVI: cyclobexyl-thiophthalimide, Santogard PVI, Flexsys;

Insoluble sulfur: Sulfur, Redbali Superfine, International Sulphur Inc.

Procedure

All components except sulfur and the vulcanization accelerant (TBBS) were mixed in an internal mixer (Brabender) for about 10 minutes (1st step).

When the temperature of 135° C. was reached, the material was mixed for another minute and then it was discharged. The unfinished compound was left to stand for a day then the sulfur, the accelerant (TBBS) was added and mixing was carried out in the same mixer at about 60° C. for 9 minutes (2nd step).

Example 4

Characterization of Vulcanizable Elastomeric Materials (G), (H), (I), (L) and (M) after Vulcanization The vulcanizable elastomeric materials G), (H), (I), (L) and (M) were vulcanized at 170° C. for 10 min in order to be able to measure their static mechanical and density properties.

The relevant mechanical properties for this type of component, static and dynamic in traction-compression, were evaluated in the same way as described in the previous Example 3.

The following Table 4 shows the results obtained from the characterizations carried out, with the exception of the vulcanization characterizations which indicated results that were substantially comparable to each other.

TABLE 4

| | (G) invention | (H) invention | (I) reference | (L) comparative | (M) comparative |
|---|---|---|---|---|---|
| Ca 0.5 (MPa) | 3.01 | 3.04 | 2.88 | 2.89 | 2.76 |
| Ca1 (MPa) | 5.98 | 5.81 | 5.82 | 5.59 | 5.17 |
| CR (MPa) | 14.02 | 12.26 | 13.68 | 12.34 | 10.87 |
| AR (%) | 252.1 | 246.8 | 238.3 | 226.5 | 232.2 |
| E' 70° C. (MPa) | 12.14 | 12.56 | 11.14 | 11.58 | 12.07 |
| Tandelta 70° C. | 0.108 | 0.103 | 0.102 | 0.107 | 0.115 |
| E' 100° C. (MPa) | 11.16 | 11.37 | 10.55 | 10.65 | 10.83 |
| Tandelta 100° C. | 0.080 | 0.081 | 0.076 | 0.079 | 0.090 |

From the analysis of the data shown in Table 4, it is clear that the vulcanizable elastomeric materials (G)-(H) according to the present invention respectively comprising 6 phr (material G) and 18 phr (material H) of lignin added as a predispersion according to the invention, show:

static mechanical properties after vulcanization Ca0.5, Ca1 and CR, indicative of the rigidity and ultimate tensile strength of the antiabrasive strip, comparable to or better than those of the reference material (I) and those of the comparative materials (L) and (M) incorporating commercial lignin powder;

dynamic mechanical properties under compression after vulcanization of dynamic elastic modulus E' at 70° C. and at 100° C., indicative of the structural properties of the antiabrasive strip, significantly better than those of the reference material (I) and better than those of the comparative materials (L) and (M) incorporating commercial lignin powder;

dynamic mechanical properties under compression after vulcanisation of tan delta at 70° C., and at 100° C., indicative of the rolling resistance of a tyre (the better the lower the value of tan delta at this temperature), comparable to or better than those of the reference material (I) and the comparative material (M) incorporating commercial lignin powder The above examples are not intended to be exhaustive, but merely illustrative examples of the advantages of the invention as defined by the following claims.

The invention claimed is:

1. A tyre for vehicle wheels comprising at least one structural element comprising a vulcanized elastomeric material obtained by vulcanizing a vulcanizable elastomeric composition comprising a predispersion of an elastomeric diene polymer and lignin obtained by a process comprising:

a) providing in a dispersant liquid a first lignin suspension having a value of a median particle diameter D50 equal to or less than 10 microns;

b) providing a second suspension comprising lignin and elastomeric diene polymer latex by mixing the first lignin suspension obtained from step a) with the latex; and c) removing the dispersant liquid from the second suspension comprising lignin and elastomeric diene polymer latex until the predispersion of elastomeric diene polymer and lignin is obtained.

2. The tyre for vehicle wheels according to claim 1, wherein a) providing the first lignin suspension comprises:

a1) providing in the dispersant liquid a coarse lignin suspension having a value of a median particle diameter D50 equal to or greater than 10 microns; and a2) wet-grinding the lignin particles contained in the coarse suspension until the median diameter D50 of the lignin particles is reduced to the value equal to or less than 10 microns, to obtain the first lignin suspension.

3. The tyre for vehicle wheels according to claim 1, wherein the predispersion of elastomeric diene polymer and lignin comprises an amount of lignin equal to or greater than about 45 phr.

4. The tyre for vehicle wheels according to claim 1, wherein the first lignin suspension has a solid residue ranging from 20% to 80% by weight, with respect to the total weight of the suspension.

5. The tyre for vehicle wheels according to claim 1, wherein the elastomeric diene polymer latex has a solid residue ranging from 10% to 80% by weight, with respect to the total weight of the latex.

6. The tyre for vehicle wheels according to claim 1, wherein the vulcanizable elastomeric composition comprises at least 10 phr of the predispersion of elastomeric diene polymer and lignin.

7. The tyre for vehicle wheels according to claim 1, wherein a polymeric component of the vulcanizable elastomeric composition is constituted only by the elastomeric diene polymer of the predispersion.

8. The tyre for vehicle wheels according to claim 1, wherein a concentration of lignin introduced in the vulcanizable elastomeric composition by the predispersion of elastomeric diene polymer and lignin ranges from 2.5 phr to 160 phr.

9. The tyre for vehicle wheels according to claim 1, wherein the lignin is chosen from Softwood Kraft lignin, Hardwood Kraft lignin, Soda Grass lignin, Wheat Straw lignin, Rice Husk lignin, lignin obtained by biorefinery processes, and Organosolv lignin.

10. The tyre for vehicle wheels according to claim 1, wherein the elastomeric diene polymer is chosen from natural rubber (NR), emulsion styrene butadiene rubber (ESBR), carboxylated styrene butadiene rubber (XSBR), nitrile rubber NBR, carboxylated nitrile rubber (XNBR), chloroprene rubber (CR), and butyl rubber (IIR).

11. The tyre for vehicle wheels according to claim 1, wherein the structural element is chosen from a tread band, a carcass structure, a belt structure, an underlayer, an antiabrasive strip, a sidewall, a sidewall insert, a mini-sidewall, a flipper, a chafer, an underliner, rubber layers, a bead filling, and rubber sheets.

12. A process for preparing a predispersion of an elastomeric diene polymer and lignin, the process comprising:

a) providing in a dispersant liquid a first lignin suspension having a value of a median particle diameter D50 equal to or less than 10 microns;

b) providing a second suspension comprising lignin and elastomeric diene polymer latex by mixing the first lignin suspension obtained from step a) with the latex; and c) removing the dispersant liquid from the second suspension comprising lignin and elastomeric diene polymer latex until the predispersion of elastomeric diene polymer and lignin is obtained.

13. The process according to claim 12, wherein a) providing the first lignin suspension comprises:

a1) providing in the dispersant liquid a coarse lignin suspension having a value of a median particle diameter D50 equal to or greater than 10 microns; and a2) wet-grinding the lignin particles contained in the coarse suspension until the median diameter D50 of the lignin particles is reduced to the value equal to or less than 10 microns, to obtain the first lignin suspension.

14. The process according to claim 12, wherein a) providing in a dispersant liquid the first lignin suspension comprises adding to the first lignin suspension an amount of at least one surfactant ranging from 0.1 parts to 60 parts by weight, of total suspension.

15. The process according to claim 12, wherein the first lignin suspension has a solid residue ranging from 20% to 80% by weight, with respect to the total weight of the suspension.

16. The process according to claim 12, wherein the first lignin suspension obtained from step a) has a % by weight of particles having a size greater than 10 microns equal to or less than 10% by weight.

17. The process according to claim 13, wherein a2) wet-grinding the coarse lignin suspension is carried out by means of a grinding apparatus chosen from ball mills, hammer mills, blade mills, roller mills, high-pressure compression mills, ring mills, vibrating tube or vibrating rod mills, and centrifugal fluid mills.

18. The process according to claim 12, wherein the elastomeric diene polymer latex has a solid residue ranging from 10% to 80% by weight, with respect to the total weight of the latex.

19. The process according to claim 12, wherein b) providing the second suspension comprising lignin and elastomeric diene polymer latex is carried out by mixing from 30 parts to 200 parts by weight, of the first lignin suspension obtained from step a) per 100 parts by weight of elastomeric diene polymer latex.

20. The process according to claim 12, wherein b) providing the second suspension comprising lignin and elastomeric diene polymer latex is carried out by mixing the first lignin suspension obtained from step a) with the latex for a time to obtain a substantially homogeneous second suspension.

21. The process according to claim 12, wherein c) removing the dispersant liquid from the second suspension comprising lignin and elastomeric diene polymer latex comprises d) drying the second suspension and, optionally, e) removing part of the dispersant liquid before drying the second suspension.

22. The process according to claim 21, wherein d) drying the second suspension comprising lignin and elastomeric diene polymer latex is carried out until a moisture content of the predispersion of elastomeric diene polymer and lignin is brought to a value equal to or less than 5% by weight.

23. The process according to claim 21, wherein d) drying the second suspension comprising lignin and elastomeric diene polymer latex is carried out in a static oven at a temperature ranging from 40° C. to 120° C. for a time ranging from 2 hours to 30 hours.

24. The process according to claim 12, further comprising f) compacting the predispersion of elastomeric diene polymer and lignin obtained from step c).

25. The process according to claim 12, wherein the lignin is chosen from Softwood Kraft lignin, Hardwood Kraft lignin, Soda Grass lignin, Wheat Straw lignin, Rice Husk lignin, lignin obtained through biorefinery processes, and Organosolv lignin.

26. The process according to claim 12, wherein the elastomeric diene polymer is chosen from natural rubber (NR), emulsion styrene butadiene rubber (ESBR), carboxylated styrene butadiene rubber (XSBR), nitrile rubber NBR, carboxylated nitrile rubber (XNBR), chloroprene rubber (CR), and butyl rubber (IIR).

27. A predispersion of elastomeric diene polymer and lignin obtained by a process according to claim 12.

28. The predispersion of elastomeric diene polymer and lignin according to claim 27, wherein the predispersion comprises an amount of lignin equal to or greater than about 45 phr.

29. A process for producing a vulcanizable elastomeric composition comprising:

feeding to at least one mixing apparatus at least the following components of a vulcanizable elastomeric composition: at least one predispersion of an elastomeric diene polymer and lignin obtained by a process according to claim 12 and at least one vulcanizing agent, mixing and dispersing the components to obtain the vulcanizable elastomeric composition, and discharging the vulcanizable elastomeric composition from the mixing apparatus.

30. The process according to claim 29, wherein feeding to at least one mixing apparatus further comprises at least one elastomeric diene polymer.

31. The process according to claim 29, wherein feeding to at least one mixing apparatus further comprises at least one reinforcing filler.

32. A process for producing a tyre for vehicle wheels, wherein the process comprises:

providing a vulcanizable elastomeric composition comprising a predispersion of an elastomeric diene polymer and lignin obtained by a process according to claim 12;

providing a structural element of a tyre comprising the vulcanizable elastomeric composition;

assembling the structural element of a tyre in a green tyre; and vulcanizing the green tyre.

* * * * *